June 11, 1968 N. SCRIBNER 3,388,333
PULSE COUNTER FREQUENCY MODULATION DETECTION
Original Filed April 12, 1963 2 Sheets-Sheet 1

INVENTOR.
Neal Scribner
BY Schmidt, Johnson, Hovey,
Williams & Bradley
ATTORNEYS.

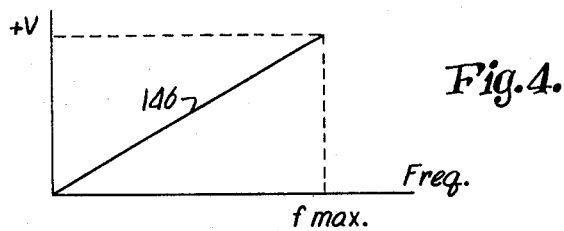
Fig.4.
Fig.5A.
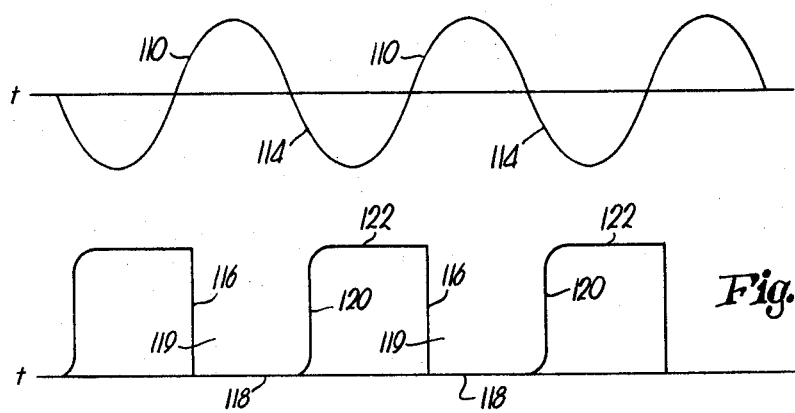
Fig.5B.
Fig.5C.
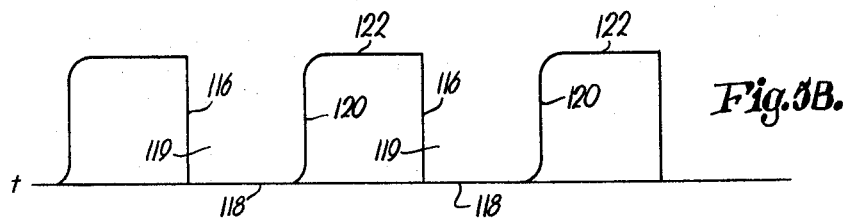
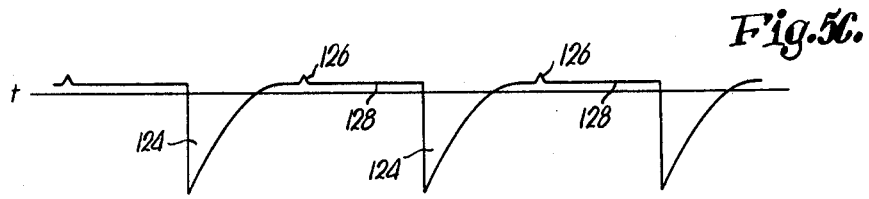
Fig.5D.
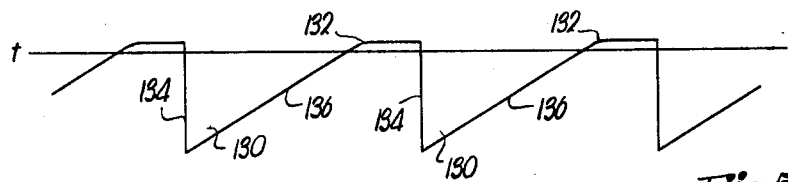
Fig.5E.
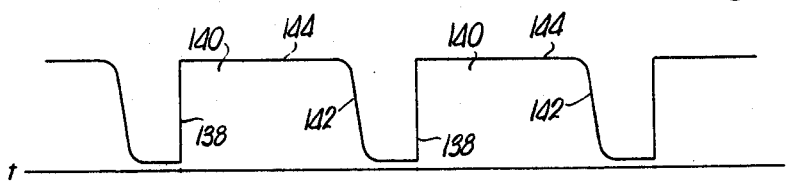

United States Patent Office 3,388,333
Patented June 11, 1968

3,388,333
PULSE COUNTER FREQUENCY MODULATION DETECTION
Neal Scribner, Independence, Mo., assignor to Wilcox Electric Company, Inc., Kansas City, Mo., a corporation of Kansas
Original application Apr. 12, 1963, Ser. No. 272,794, now Patent No. 3,351,864, dated Nov. 7, 1967. Divided and this application Aug. 22, 1967, Ser. No. 662,504
6 Claims. (Cl. 329—104)

ABSTRACT OF THE DISCLOSURE

A radio navigation receiver is adapted to receive a space modulated carrier component and a frequency modulated subcarrier component of a navigation signal and has an AM detector which passes the space modulation and the subcarrier. Subsequent filter circuitry separates the space modulation and the subcarrier, the latter being fed to a pulse counter demodulator for detection of the modulating signal. The pulse counter demodulator utilizes bistate switching means responsive to a predetermined, low amplitude level of each half cycle of the subcarrier for producing a train of generally rectangular pulses which are fed to succeeding circuitry where the modulating signal is recovered. Such modulating signal and the detected space modulation are then fed to separate inputs of a phase angle meter where a phase comparison of the two detected signals is effected.

---

Figure 1:
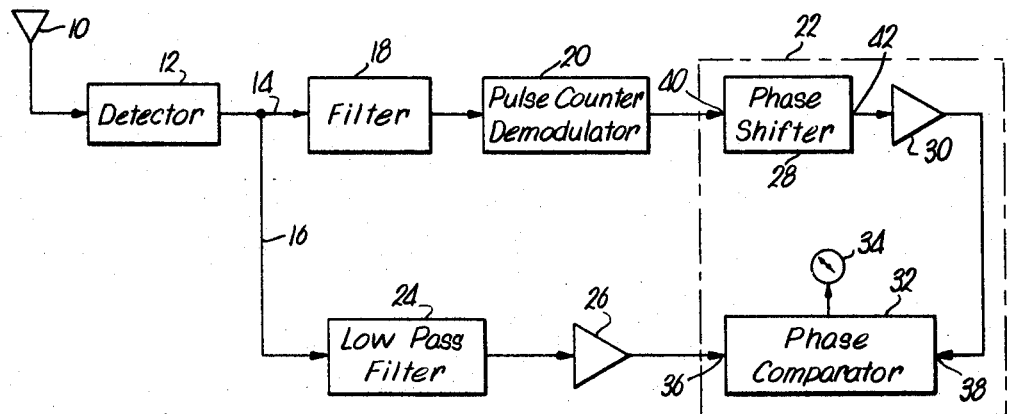

This application is a divisional application of my copending application Ser. No. 272,794, filed Apr. 12, 1963, now U.S. Letters Patent No. 3,351,864, granted November 7, 1967, and entitled "Pulse Counter Frequency Modulation Detection."

This invention relates generally to frequency modulation detection systems and, more specifically, to an improved radio navigation receiver including an improved pulse-counter type demodulator.

A commonly employed VHF navigational system for aircraft utilizes the phase difference between a pair of detected radio signals as a means of indicating to the pilot or navigator of an aircraft the position of such aircraft relative to a ground reference point from which such signals are emanating. For example, in the basic VHF omnidirectional range system a high frequency carrier signal is radiated from a rotating transmitting antenna which has a 360° angular sweep. The transmitted carrier contains a subcarrier or side band which is frequency modulated at a frequency equal to the sweep frequency of the antenna. Means is employed to maintain the amplitude of the subcarrier at a constant level regardless of antenna position.

The receiver in an aircraft within the range of these signals is aware of an amplitude modulation on the carrier due to the swinging of the directional antenna. This is commonly referred to as "space modulation" and as aforesaid, is of the same frequency as the frequency modulations impressed upon the subcarrier. Therefore, after detection of the space modulation and of the modulating signal impressed upon the subcarrier, a phase comparison is made by the receiver circuitry to ascertain the phase difference between the two detected signals. Commonly, the space and frequnecy modulations are placed on their respective signals such that receivers located due north of the transmitting station will detect the modulations in phase, while receivers located other than due north of the station will receive the modulations out-of-phase by a phase angle characteristic of that particular azimuth.

From the foregoing it may be appreciated that any phase errors introduced into the detected carrier or subcarrier signals will necessarily result in an erroneous indication of the position of the aircraft relative to the transmitting station. The probability of such error is especially acute in the detection of the frequency modulated subcarrier since demodulators are often sensitive, to a degree, to amplitude fluctuations in the modulated signal. Amplitude modulation may be placed upon the subcarrier by atmospheric effects or by the receiver circuitry itself. In either event, a detected AM component along with the detected FM component will produce a resultant signal which is not in phase with either of its two components. Therefore, the output signal from the frequency modulation detector will be out-of-phase with the frequency modulating signal by an amount corresponding to the severity of the amplitude modulation detection.

It is, therefore, an object of this invention to provide a phase-comparing radio navigation receiver which is unresponsive to any amplitude variations that may be present in the frequency modulated navigation signal received thereby.

It is another object of this invention to provide a phase-comparing radio navigation receiver employing a pulse-counter type frequency modulation demodulator.

It is another object of this invention to provide an improved method of demodulating a frequency modulated, periodic, electrical signal, which method is unaffected by amplitude modulation of the signal.

It is another object of this invention to provide a pulse-counter demodulator of minimum size and weight employing no vacuum tube components or bulky filter networks, thus especially adapting the demodulator for use in aircraft receivers.

It is still another object of this invention to provide a pulse-counter demodulator employing a hybrid tunnel diode-transistor circuit responsive to the incoming signal, electrical means responsive to the output of the hybrid circuit for producing a series of pulses of equal amplitude and width regardless of the period of the incoming signal, and output means responsive to the series of pulses for providing an output signal having an amplitude level proportional to the rate of recurrence of said pulses.

It is yet another object of this invention to provide a pulse-counter demodulator employing a hybrid tunnel diode-transistor switching circuit responsive to a frequency modulated, incoming signal for producing a first series of electrical pulses, a clamped differentiator network responsive to said first series of pulses for producing a second series of electrical pulses, a capacitor discharge circuit responsive to said second series of pulses for increasing the duration of each pulse of said second series to a predetermined fixed width, a transistor switch having its input coupled with the capacitor discharge circuit and operable thereby to produce at its output a train of electrical pulses of equal amplitude and width, and an integrator network coupled with the output of the transistor switch for integrating said pulse train to provide an output signal having an amplitude level proportional to the frequency of the incoming signal.

Other objects will become apparent as the detailed description proceeds.

Figure 2:
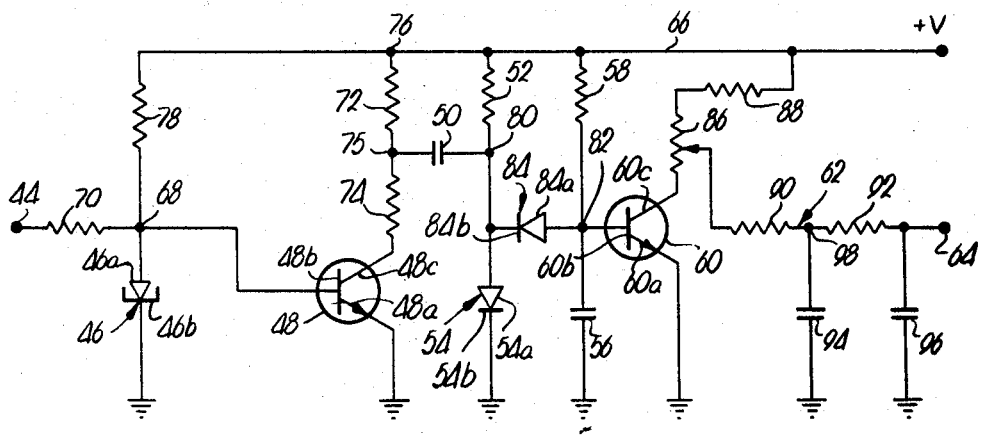
Figure 3:
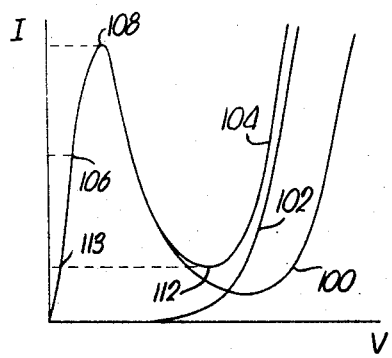

In the drawings:
FIGURE 1 is a block diagram of the improved radio navigation receiver;
FIG. 2 is a schematic circuit diagram of the pulse-counter demodulator of the present invention;
FIG. 3 is a graph illustrating the operation of the hybrid tunnel diode-transistor switching circuit;

FIG. 4 is a graph showing the output characteristics of the pulse-counter demodulator; and FIGS. 5A–5E are graphs showing the voltage wave forms at various points in the circuitry of FIG. 2 to be described fully hereinafter.

Referring to FIG. 1, it may be seen that a receiving antenna 10 is coupled with an amplitude modulation detector 12 having its output coupled with arms 14 and 16 of the phase-comparing circuitry. More specifically, using the above-described VHF omnidirectional range navigation system as an example, the space modulated carrier component and the frequency modulated subcarrier component of the signal emanating from the transmitting antenna are received by antenna 10 and conducted to the detector 12. Detector 12, which may employ as preceding stages an RF amplifier, a converter and an IF amplifier as in conventional superheterodyne receiver systems, then blocks the high frequency carrier and permits the subcarrier or side band component and the space modulation on the carrier component to pass to the succeeding circuitry.

A filter 18 which may be of the band-pass or high-pass type is employed in arm 14 to eliminate the space modulation and allow the frequency modulated subcarrier to pass substantially unattenuated. It may be appreciated that the space modulation will be of quite low frequency, frequently on the order of 30 c.p.s. and thus the separation of the two signals by conventional filter networks may be readily be accomplished.

The subcarrier is then fed to a pulse-counter demodulator 20 where the modulating signal is detected. The modulating signal is then conducted to a phase angle meter 22 to be described more fully hereinafter.

Arm 16 contains a low-phase filter 24 which permits the passage of the low frequency space modulation therethrough and which suppresses the higher frequency subcarrier. An amplifier 26 may then be employed to boost the amplitude level of the detected space modulation prior to introducing the same to phase angle meter 22.

The pulse counter demodulator such as illustrated at 20 for extracting the intelligence from the frequency modulated subcarrier is a substantial improvement over demodulators employed heretofore in navigation receivers. Pulse-counter demodulators are unresponsive to any amplitude changes or modulations appearing on the subcarrier and thus are not subject to the phase errors discussed above. In radio navigation systems, amplitude modulation of the subcarrier may occur due to unforeseen space modulation effects, identification tones transmitted by the ground station, identification broadcasts by voice, other voice transmissions such as weather reports, etc. and interference. Within the receiver itself, nonlinearity and intermodulation in the detector 12 may also induce amplitude modulation of the subcarrier.

The phase angle meter 22 comprises a phase shifter or phase shift network 28, an amplifier 30, a phase comparator 32, and an indicator device 34. Phase comparator 32 is responsive to a predetermined phase difference between signals appearing at its inputs 36 and 38. When this phase difference actually exists at terminals 36 and 38, indicator 34 so indicates by the centering of an indicator needle or the like.

Phase shifter 28 is an adjustable device capable of shifting the phase of an electrical signal during the passage of such signal from its input 40 to its output 42. The phase shifter is adjusted by the pilot during operation of the receiver until the needle or other indicating means of the device 34 centers. By appropriate calibrations of the phase shifter adjustment the pilot is made aware of the azimuth of the aircraft relative to the ground transmitting station. Alternatively, of course, the phase shifter may be set at the desired azimuth and the course of the plane altered by the pilot until the needle of indicator 34 centers. This procedure and the internal circuitry of phase angle meter 22 shown in FIG. 1, is conventional in the radio navigation art and need not be further dealt with in detail in this specification.

Referring to FIGS. 2–5E, an improved pulse-counter demodulator is shown. In FIG. 2 circuitry of the demodulator is schematically illustrated and comprises an input terminal 44, a hybrid switching circuit having a tunnel diode 46 and an NPN transistor 48 as components thereof, a clamped differentiator circuit comprising a capacitor 50, a resistor 52, and a diode 54, a capacitor discharge circuit comprising a capacitor 56 and a resistor 58, an NPN switching transistor 60, an integrator circuit generally designated 62, and an output terminal 64. Electrical power is supplied from a direct current source (not shown) having its positive terminal connected to bus 66 and its negative terminal grounded. It should be understood that ground serves as the other electrical side of both input terminal 44 and output terminal 64.

More specifically, tunnel diode 46 comprises an anode 46a which is connected to junction point 68, and a cathode 46b which is connected to ground. Transistor 48 has an emitter 48a connected to ground, a base 48b connected to junction point 68, and a collector 48c. A resistor 70 couples junction point 68 with input terminal 44, resistor 70 being employed as an impedance matching device so that the circuitry connected to input terminal 44 will present a relatively high impedance source to the input of the hybrid switching circuit.

The collector 48c is connected to the positive bus 66 at junction point 76. This connection is effected through series connected resistors 72 and 74, interconnected at junction point 75, which set the operating characteristics of the input circuit of transistor 48. Junction points 68 and 76 are interconnected by resistor 78. The function of resistor 78 will be described when the operation of the circuitry is discussed hereinafter.

Capacitor 50 of the differentiator network is connected between junction point 75 and junction point 80. Resistor 52 of the differentiator network is connected between junction point 80 and the positive bus. Diode 54 has its anode 54a connected to junction point 80 and its cathode 54b connected to ground.

The capacitor 56 and resistor 58 of the capacitor discharge circuit are serially connected at junction point 82. The other end of resistor 58 is connected to the high voltage bus, while the other lead from capacitor 56 is connected to ground. A series circuit of capacitor 56 and resistor 58 is thus formed across the terminals of the power source, such series circuit being coupled with the preceding circuitry by a clipping diode having its anode 84a connected to junction point 82, and its cathode 84b connected to junction point 80.

Switching transistors 60 has an emitter 60a connected to ground, a base 60b connected to junction point 82, and a collector 60c. An adjustable resistor 86 serially connected with a resistor 88 of fixed value, couples collector 60c with the positive bus 66.

Integrator network 62 comprises an RC filter consisting of resistors 90 and 92 and capacitors 94 and 96. Resistors 90 and 92 are interconnected in series at junction point 98. The other end of resistor 90 is connected with the variable tap or slider of variable resistor 86, while the other end of resistor 92 is connected to output terminal 64. Capacitor 94 is connected across junction point 98 and ground, while capacitor 96 is connected between output terminal 64 and ground.

The operation of the circuitry of FIG. 2 will now be described. Referring to FIG. 5A, the graph illustrates the sinusoidal voltage wave form of an incoming electrical signal appearing at input terminal 44. (In the radio navigation system discussed above, the signal illustrated in FIG. 5A is the frequency modulated subcarrier emanating from the output of filter 18.) It may be noted that the signal shown in FIG. 5A is of constant frequency and period, thus illustrating an unmodulated carrier signal.

When such carrier is frequency modulated, of course, the frequency will vary in accordance with the modulating signal and the period of the carrier will increase and decrease correspondingly.

Referring to FIG. 3, curve 100 is the characteristic curve of tunnel diode 46, curve 102 illustrates the input characteristic of transistor 48, and curve 104 is a net input characteristic of the tunnel diode-transistor combination obtained by graphical addition of curves 100 and 102. Point 106 on curve 104 illustrates the quiescent operating point of the tunnel diode-transistor combination. At such point, a current corresponding to the ordinate or current axis coordinate of point 106 flows through resistor 78 and tunnel diode 46. Under such condition, transistor 48 is in the nonconductive state as may be appreciated from FIG. 3. The presence of the input voltage wave form as shown in FIG. 5A, however, at junction point 68, increases the voltage thereof with respect to ground, and the current level rises to point 108 placing the tunnel diode and the transistor in heavy conduction in accordance with tunnel diode switching characteristics well known in the art.

This switching point corresponds to point 110 on the input voltage wave form. Subsequently, when the input wave reaches a potential of substantially the same magnitude but of opposite polarity, the current through the tunnel diode-transistor combination is reduced to a level corresponding to point 112 on the composite curve 104. Since the action of the tunnel diode will then move the operating point from 112 to the stable state at the same current level represented by point 113, the emitter-collector circuit of transistor 48 ceases to conduct. This corresponds to point 114 on the input voltage wave form.

It may be appreciated from the foregoing that the ohmic value of resistor 78 is selected such that switching will occur at a pair of time-spaced amplitudes of the input signal which are of substantially equal, relatively low magnitude but of opposite polarity. This assures that the tunnel diode-transistor combination will operate in the same manner, regardless of amplitude fluctuations in the input signal. The circuitry is thus rendered unresponsive to amplitude modulations on the input signal, it being requisite only that the amplitude of the input signal reach a value sufficient to switch the hybrid switching circuit. In practice, these amplitudes represented at 110 and 114 will be extremely low relative to the amplitude peaks of the input signal due to amplification thereof prior to introduction of the signal to the circuitry of FIG. 2. The output voltage wave form appearing at collector 48c of transistor 48 is shown in FIG. 5B. This wave form shows the potential at the collector with respect to the emitter 48a or ground during the switching sequence above described.

It should be understood from FIGS. 5A to 5E that points on the wave forms shown in the figures in vertical alignment are coincident in time. Furthermore, points lying above the time axes of the figures indicate voltages of positive polarity, while points lying below the time axis represent voltages of negative polarity. Therefore, the negative excursion 116 of the wave form shown in FIG. 5B coincides in time with point 110 on the wave form of FIG. 5A.

From the foregoing it may be appreciated that when the input signal causes transistor 48 to be switched into the conductive state, the voltage at the collector 48c drops very rapidly along excursion 116 to zero along line 118. This initiates the production of a pulse 119. Subsequently, at point 114 on the input wave form, transistor 48 is switched back into the nonconductive state and the collector voltage rises along positive excursion 120 to the level indicated at 122. Level 122, of course, is essentially the same as the potential difference existing between positive bus 66 and ground. It should be noted that the width of the voltage pulses at collector 48c will vary with the period of the input wave, but remain of constant amplitude. Furthermore, the width of the voltage pulses will be equal to the spacing therebetween for all input signal frequencies.

The voltage pulses from transistor 48 are differentiated by the differentiator network comprising capacitor 50 and resistor 52. Elements 50 and 52 comprise a conventional differentiator network and produce an output voltage at junction point 80 having a wave form as shown in FIG. 5C. The action of diode 54 clamps the differentiator output thereby substantially reducing the positive voltage spikes. This clamping action is vividly shown by the wave form in FIG. 5C wherein the voltage pulse corresponding to the negative excursion 116 is shown at 124, and the clamped pulse corresponding to positive excursion 120 is shown at 126. The minute pulse 126 is present due to the nonlinear characteristics of the diode 54. The small quiescent voltage level 128 exists due to the resistance of the diode in the forward conduction direction.

The series of pulses 124 from the diffentiator network are fed to the capacitor discharge circuit comprising capacitor 56 and resistor 58 through diode 84. The function of diode 84 is to clip the small spike or pulse 126 and isolate the discharge path of capacitor 56. FIG. 5D shows the voltage wave form appearing at junction point 82 with respect to ground and clearly illustrates that the capacitor discharge circuit serves to increase the width of pulses 124 to a predetermined duration. Pulses 130 commence coincident in time with corresponding pulses 124 but terminate at times illustrated by points 132. Each pulse 130 commences with a sharp negative excursion 134 and decays along a negative ramp 136 corresponding to the discharge of capacitor 56.

Since the train of negative pulses 130 appears across the emitter-base junction of transistor 60, the transistor is rapidly switched into the nonconductive state by the leading edge of each pulse. Similarly, the emitter-collector circuit of transistor 60 returns to the conductive state as the trailing edge of each pulse 130 passes into the region of positive potential. This is illustrated in FIG. 5E wherein the train of output voltage pulses appearing at the collector 60c is shown. The vertical edge 138 of each pulse 140 is coincident in time with the corresponding excursion 134, and the tapered trailing edge 142 occurs approximately coincident with the corresponding point 132; between edges 138 and 142 the pulse is of constant amplitude as shown at 144.

It may be appreciated that each pulse 140 will be of the same amplitude and width, the only variation in the train of pulses 140 being in the spacing between adjacent pulses.

The adjustable resistor 86 serves as a gain control and establishes the amplitude of pulses 140. The integrator circuit 62 is a network of conventional design which produces at output terminal 64 a signal having an amplitude level proportional to the rate of recurrence of pulses 140.

Referring to FIG. 4, the output characteristic of the invention is shown. Line 146 vividly illustrates the linear response characteristics of the output signal appearing at terminal 64. It will be appreciated that as the frequency of the incoming signal varies, due to modulation thereof, the voltage level of the output signal appearing at terminal 64 will vary proportionally. This occurs until a maximum input signal frequency is reached where the width of each pulse 140 is equal to the period of the input signal.

Having above described the apparatus of the present invention, the method aspect thereof may now be readily appreciated. The method taught by the invention of demodulating a frequency modulated, electrical signal comprises the following steps.

First, a first series of electrical pulses is generated responsive to the signal, each of the pulses being triggered by and commencing coincident in time with a predetermined characteristic of the wave form of a corresponding periodic recurrence of the signal and terminating during said corresponding periodic recurrence. The triggering of the pulses is illustrated by FIGS. 5A and 5B wherein the points 110 on the voltage wave form of the incoming signal correspond to the negative excursions 116 of pulses 119. Termination of each pulse 119 is shown at 120 which corresponds to point 114 on the incoming signal wave form.

Secondly, the first series of pulses is electrically differentiated to obtain a train of electrical pulse pairs, each pulse of the pulse pair commencing coincident in time, respectively, with the rise and fall of a corresponding pulse of the first series of pulses. This is illustrated in FIGS. 5B and 5C wherein pulses 124 and 126 correspond, respectively, with excursions 116 and 120 of pulses 119.

Thirdly, a second series of electrical pulses is produced responsive to every other pulse of the train of pulse pairs, the pulses of said second series being of equal durations, each of which is triggered by and commences coincident in time with the corresponding pulse of the train of pulse pairs. This step is illustrated in FIGS. 5C and 5D where it may be seen that the minute pulses 126 are eliminated when pulses 130 are produced.

Fourthly, a third series of electrical pulses is generated responsive to the second series of pulses, the pulses of the third series being of equal amplitudes and widths, each of which is triggered by and commences coincident in time with the corresponding pulse of the second series of pulses. This is accomplished by applying the second series of pulses to a bistate, electrically responsive switching device having a source of constant, direct voltage coupled with the load-switching terminals thereof. (Such a device is shown in FIG. 2 as transistor 60, the emitter 60a and collector 60c constituting the load-switching terminals thereof.) In this manner the third series of pulses is obtained at the load-switching terminals. This step is shown in FIGS. 5D and 5E wherein pulses 130 represent the second series of pulses, and pulses 140 represent the third series of pulses.

Fifthly, the third series of pulses is integrated to obtain an output signal whose amplitude level is proportional to the frequency of the incoming signal.

Having thus described the invention, what is claimed as new and desired to be secured by Letters Patent is:

1. Apparatus for receiving a signal having an amplitude modulated carrier component and a frequency modulated, periodic subcarrier component comprising:

detector means responsive to said signal and adapted to have said signal applied thereto for demodulating said carrier component and passing said subcarrier component;
  first frequency selective means coupled with said detector means for selectively passing said subcarrier component;
  second frequency selective means coupled with said detector means for selectively passing said demodulated carrier component;
  a pulse counter demodulator coupled with said first frequency selective means and responsive to said subcarrier component for detecting the latter; and
  output means coupled with said pulse counter demodulator and said second frequency selective means and responsive to said detected subcarrier component and said demodulated carrier component for comparing the phases thereof and indicating the phase relationship therebetween,
  said demodulator comprising means responsive to said subcarrier component for producing a train of pulses of substantially equal amplitude and width, each of said pulses commencing during a corresponding periodic recurrence of said subcarrier component, and means responsive to said pulse train for producing an output signal having an amplitude level proportional to the recurrence rate of said pulses, whereby said subcarrier component is detected.

2. Apparatus for receiving a signal having an amplitude modulated carrier component and a frequency modulated, periodic subcarrier component comprising:

detector means responsive to said signal and adapted to have said signal applied thereto for demodulating said carrier component and passing said subcarrier component;
  first frequency selective means coupled with said detector means for selectively passing said subcarrier component;
  second frequency selective means coupled with said detector means for selectively passing said demodulated carrier component;
  a pulse counter demodulator coupled with said first frequency selective means and responsive to said subcarrier component for detecting the latter; and
  output means coupled with said pulse counter demodulator and said second frequency selective means and responsive to said detected subcarrier component and said demodulated carrier component for comparing the phases thereof and indicating the phase relationship therebetween,
  said demodulator comprising first means responsive to a pair of time-spaced amplitude levels of said subcarrier component for producing a series of electrical pulses successively commencing and terminating in substantial time coincidence with one of said levels and the other of said levels respectively, whereby each of said pulses occurs during a corresponding periodic recurrence of said subcarrier component, and second means responsive to said series of pulses for deriving therefrom an output signal having an amplitude level which varies in accordance with changes in the frequency of said subcarrier component, whereby the latter is detected.

3. The invention of claim 2, said second means including circuit means coupled with said first means for producing a train of output pulses of substantially equal amplitude and width, each output pulse occurring in response to a corresponding pulse of said series of pulses, and output means coupled with said circuit means and responsive to said train of output pulses for providing said output signal with said amplitude level thereof being proportional to the rate of recurrence of said output pulses.

4. Apparatus for receiving a signal having an amplitude modulated carrier component and a frequency modulated, periodic subcarrier component comprising:

detector means responsive to said signal and adapted to have said signal applied thereto for demodulating said carrier component and passing said subcarrier component;
  first frequency selective means coupled with said detector means for selectively passing said subcarrier component;
  second frequency selective means coupled with said detector means for selectively passing said demodulated carrier component;
  a pulse counter demodulator coupled with said first frequency selective means and responsive to said subcarrier component for detecting the latter; and
  output means coupled with said pulse counter demodulator and said second frequency selective means and responsive to said detected subcarrier component and said demodulated carrier component for comparing the phases thereof and indicating the phase relationship therebetween,
  said demodulator comprising electrically responsive, bistate switching means responsive to a pair of time-spaced amplitude levels of said subcarrier component for producing a series of electrical pulses successively commencing and terminating in substantial time coincidence with one of said levels and the other of said levels respectively, whereby each of said pulses occurs during a corresponding periodic recurrence of said subcarrier component, circuit means coupled with said switching means for producing a train of output pulses of substantially equal amplitude and width, each output pulse occurring in response to a corresponding pulse of said series of pulses, and output means coupled with said circuit means and responsive to said train of output pulses for providing an output signal having an amplitude level proportional to the rate of recurrence of said output pulses, whereby said subcarrier component is detected.

5. Apparatus for receiving a signal having an amplitude modulated carrier component and a frequency modulated, periodic subcarrier component comprising:
  detector means responsive to said signal and adapted to have said signal applied thereto for demodulating said carrier component and passing said subcarrier component;
  first frequency selective means coupled with said detector means for selectively passing said subcarrier component;
  second frequency selective means coupled with said detector means for selectively passing said demodulated carrier component;
  a pulse counter demodulator coupled with said first frequency selective means and responsive to said subcarrier component for detecting the latter; and
  output means coupled with said pulse counter demodulator and said second frequency selective means and responsive to said detected subcarrier component and said demodulated carrier component for comparing the phases thereof and indicating the phase relationship therebetween,
  said demodulator comprising electrically responsive, bistate switching means responsive to a pair of time-spaced amplitude levels of said subcarrier component for producing a first series of electrical pulses successively commencing and terminating in substantial time coincidence with one of said levels and the other of said levels respectively, whereby each of said pulses occurs during a corresponding periodic recurrence of said subcarrier component, circuit means coupled with said switching means and responsive to said first series of pulses for electrically differentiating the latter, whereby to provide a second series of electrical pulses, electrical means coupled with said circuit means and responsive to every other pulse of said second series of pulses for producing a train of output pulses of substantially equal amplitude and width, each of which commences substantially coincident in time with a corresponding pulse of said second series of pulses, and output means coupled with said electrical means and responsive to said train of output pulses for providing an output signal having an amplitude level proportional to the rate of recurrence of said output pulses, whereby said subcarrier component is detected.

6. The invention of claim 5,
  said amplitude levels of said subcarrier component being positive and negative respectively and low relative to the peak amplitudes of the subcarrier component.

References Cited

UNITED STATES PATENTS

| | | | |
|---|---|---|---|
| 2,988,695 | 6/1961 | Leavitt | 324—82 |
| 3,128,437 | 4/1964 | Loughlin | 329—126 X |
| 3,172,053 | 3/1965 | Ronzheimer | 329—126 X |
| 3,351,864 | 11/1967 | Scribner | 329—109 X |

ALFRED L. BRODY, *Primary Examiner.*